United States Patent [19]

Wasserman et al.

[11] Patent Number: 5,650,461

[45] Date of Patent: Jul. 22, 1997

[54] PAINT COMPOSITIONS FOR HIGH INFRA-RED REFLECTIVITY WITH A LOW GLOSS PROPERTY

[75] Inventors: Shulamit Wasserman, Haifa; Igal E. Klein, Carmiel, both of Israel

[73] Assignee: State of Israel-Ministry of Defence, Armament Development Authority, RAFAEL, Haifa, Israel

[21] Appl. No.: 524,044

[22] Filed: Sep. 6, 1995

Related U.S. Application Data

[63] Continuation-in-part of Ser. No. 344,567, Nov. 23, 1994, abandoned.

[30] Foreign Application Priority Data

Aug. 17, 1994 [IL] Israel ..................................... 110683
Nov. 18, 1994 [IL] Israel ..................................... 111688

[51] Int. Cl.$^6$ ..................... C08K 3/08; C08K 5/01
[52] U.S. Cl. ............... 524/441; 524/439; 524/440; 524/444; 524/431; 524/502; 524/507
[58] Field of Search ................... 524/441, 440, 524/439, 444, 431, 502, 507

[56] References Cited

U.S. PATENT DOCUMENTS

| | | | |
|---|---|---|---|
| 3,234,038 | 2/1966 | Stephens | 524/441 |
| 4,131,593 | 12/1978 | Mar et al. | 524/780 |
| 4,156,678 | 5/1979 | Krueger | 260/42.37 |
| 4,289,677 | 9/1981 | Supcoe et al. | 524/413 |
| 4,356,036 | 10/1982 | Kaliardos | 524/441 |
| 4,474,966 | 10/1984 | Maeno | 549/396 |
| 4,499,143 | 2/1985 | Panush | 428/336 |
| 4,725,317 | 2/1988 | Wheeler | 524/441 |
| 4,725,640 | 2/1988 | Cowls | 524/441 |
| 4,753,829 | 6/1988 | Panush | 523/210 |
| 5,169,719 | 12/1992 | Balatan | 428/423.1 |

*Primary Examiner*—Paul R. Michl
*Assistant Examiner*—Olga Asinovsky
*Attorney, Agent, or Firm*—Cowan, Liebowitz & Latman, P.C.

[57] ABSTRACT

The present invention relates to paint compositions which provide a Chemical Agent Resitant Coating (CARC), consisting of one layer topcoat paint system, which imparts an increase in the reflectivity at the thermal infra-red region, while controlling the colour in the visible range and are maintaining a low gloss, comprising: an extender selected from polyolefins and substituted polyolefins; a pigment, selected from a metal oxide calcined at a temperature of above 600° C. and a paste of metal flakes and any mixture thereof; a binder consisting of a modified polyurethane resulted from an isocyanate and a co-reactant possessing at least two hydroxy groups, and a solvent system to dissolve the components in the paint composition.

7 Claims, No Drawings

PAINT COMPOSITIONS FOR HIGH INFRA-RED REFLECTIVITY WITH A LOW GLOSS PROPERTY

This is a Continuation In Part to our patent application Ser. No. 08/344,567 filed on Nov. 23, 1994, now abandoned.

The present invention relates to paint compositions possessing a high infra-red reflectivity and low gloss. More particularly, the invention relates to paint compositions possessing the above optical properties and are imparting a Chemical Agent Resistant Coating (CARC) as required by the Military Specification MIL-C-46186 (ME). This is a continuation in part (c.i.p.) to our previous patent application Ser. No. 08/344,567 filed on Nov. 23, 1994.

BACKGROUND OF THE INVENTION

The above Military Specifications for the CARC, provide the requirements imposed in order to comply with the allowable range of values of optical and radiometric properties. Thus, it provides the allowable range of values of optical and radiometric properties. For example, it quotes the X,Y tristimulus colour coordinates, the infra-red diffuse reflectance at 1.5 micrometer, and the specular reflectance. The paint compositions according to the above Military Specification, include two main components:

Part A, which consists of phthalic trimethylol propane ester combined with a primer, extender, pigments and volatile solvents, and Part B, consisting of an aliphatic isocyanate prepolymer combined with volatile solvents.

However,the above Military Specification does not mention anything in respect to the reflectivity in the thermal infra-red region. Furthermore, once special reflecting additives and auxiliaries are mixed in the paint system, said Specification does not impose any requirement in respect to the compatibilty with the paint system or the durability of the coating with the respective paint composition. Therefore, it is required to carry out a proper selection that the respective pigments should be compatible with the paint system, without affecting the stability of the paint or the durability of the coating. In our above U.S. patent application Ser. No. 08/344,567 there were disclosed paint compositions possessing a low gloss and high reflectance in the infra-red range of between 3 to 14 micrometers. These compositions include:

a special family of pigments, which are transparent to thermal infra-red radiation selected from a metal oxide calcined at a temperature of above 600° C. and a paste of a metal flakes;

a binder selected from alkyds, polyurethanes, vinylic and epoxy compounds, silicones, acrylic resins and mixtures thereof;

an extender selected from polyolefins and substituted polyolefins, and the other common constituents normally present in a paint composition.

According to U.S. Pat. No. 4,034,129, a coating system is described which possesses a high absorptivity in the visible range and low infra-red emissivity. The system comprises:

(a) a highly reflective metallic substrate;

(b) a layer of semiconductor pigment which possesses the property to absorb in the visible range, transparent to infra-red radiation and a low enough refractive index, and (c) a binding overcoat of alkali metal silicates cured at a temperature in the range of 150° C. to 550° C.

According to the U.S. Pat. No. 4,310,596, a coating for solar collector is claimed, comprising a finely divided black spinel pigment based on a cobalt or copper oxide. The selective properties of this coating such as-infra-red emittance below 0.35, are obtained only at a very thin thickness of about 1 μm, while a thickness of 4 μm and above, gave rise to infra-red emittance in the range of 0.49 to 0.62, which are not useful in the present invention.

In the U.S. Pat. No. 4,311,623, a low infra-red emitting paint is described comprising a non-leafing aluminum powder, aluminum oxide, antimony trisulfide and a silicone alkyd resin. It is mentioned that a drop occurs in the emmissivity in the 3–5 μm range from 0.797 to 0.463.

It is an object of the present invention to provide paint compositions possessing high infra-red reflectivity and low gloss, imparting at the same time coating conforming the Military Specification requirements of the CARC type. It is another object of the present invention, to provide paint compositions which impart the coating conforming the Military Specification requirements of the CARC type, without affecting the improved optical properties of said paint compositions.

BRIEF DESCRIPTION OF THE INVENTION

The invention relates to paint compositions which impart also a Chemical Agent Resistant Coating (CARC), consisting of one layer topcoat paint system which imparts an increase in the reflectivity at the thermal infra-red region, while controlling the colour in the visible range and are maintaining a low gloss, which comprise:

an extender selected from polyolefins and substituted polyolefins;

a pigment selected from a metal oxide calcined at a temperature of above 600° C. and a paste of metal flakes or any mixture thereof;

a binder, and a solvent system to dissolve the components in the paint compositions, being characterized by the fact that the binder used is a modified polyurethane resulted from an isocyanate and a co-reactant possessing at least two hydroxy groups. The co-reactant is selected from acrylic, epoxy and polyester, the latter being the most preferred. It was surprisingly found, that a common polyurethane as obtained from an isocyanate and a co-reactant which is not a phtalic acid polyester does not fulfill the requirements of CARC to withstand to chemical agents and contaminants.

DETAILED DESCRIPTION OF THE INVENTION

The invention is based on a synergistic effect which was found to exist between the above constituents, which imparts the following beneficial properties:

high reflectivity in the thermal infra-red, generally encountered in the range of between 0.1 to 0.7;

low gloss;

a controllable colour, and

Chemical Agent Resistant Coating properties.

Contrary to some prior references, which require a two layer system consisting of a highly reflective substrate and a transparent binder, according to the present invention the nature of the substrate is immaterial. It was surprisingly found that in spite of the incorporation of metallic flakes pigments to the paint formulation, the reflectivity in the Near infra-red range of the resulted coating, could be maintained still within the Specification. The colour in the visible range can be adjusted according to a specific requirement, maintaining the desired low gloss.

Typical examples of polyolefin as extender, are polyethylene, polypropylene, etc.

The metal oxide used as pigment, should be calcined at a temperature of at least 600° C., in order to impart a high reflectivity to the paint composition. It seems that the calcination at a temperature of above 600° C., produces a solid solution which is transparent in the thermal infra-red region and thus will impart to the paint a film possessing a high reflection in that region. The metal to be used may be selected from cobalt, aluminum, nickel, copper and zinc or a mixture thereof, most preferable being those having a particle size below 325 mesh.

The non-leafing metallic flakes, are in the form of a paste in a mineral spirit or another volatile hydrocarbon such as xylene, iso-butyl ketone, which afford a high reflectivity. The paste imparts to the flakes particular characteristic surface properties and protects said surface against oxidation.

The paint compositions, contain also a solvent, generally being of the aromatic type possessing a significant volatility property. Typical examples of such solvents are the aromatic hydrocarbons, ketones, etc.

In addition to the main components of the paint compositions as mentioned above, other auxiliary additives may be incorporated, such as: thickeners, plasticizers, surface-active agents, biocides, dispersants, flow modifying agents, fungicides, fire retardants, ultra-violet stabilizers, etc.

Typical paint compositions, including the main constituents according to the present invention are given below (the percentages are by weight):

PART A:

Polyester as binder, in the range of between 20% to 55% and preferably between 25% to 35%;

Calcined oxide as pigment, in the range of between 30% to 50%, and preferably between 35% to 40%;

Metal flakes, in the range of between 12% to 30%, and preferably between 14% to 18%;

Polyolefin extender, in the range of between 3% to 7%, and preferably between 4% to 6%;

Wetting agents, in the range of between 0.3% to 1%, and preferably between 0.5% to 0.7%;

Anti-setting agent, in the range of between 0.3% to 1% and preferably between 0.5% to 0.8%, and Solvent, between 20% to 30%.

PART B:

Aliphatic isocyanate prepolymer, in a mixture of xylene-butyl acetate (1:1, by volume) with about 70% solids.

The invention will be hereafter illustrated by the following four Examples (1 to 4), being understood that these Examples are presented only for a better understanding of the invention. After each Example, comparative ones (a to d) are also given for comparison purposes, using common constituents for such paint compositions as known in the art.

EXAMPLE 1

In part A, an amount of 4.5 g of polyethylene-polypropylene as an extender was mixed with 31 g of a yellow calcined oxide and 17 g of non-leafing aluminum paste as pigments. To the mixture, the following usual additives were incorporated:

0.5 g of anti tera U as wetting agent;

0.5 g of Benton 38 (Trade Mark) an antisetting agent, and 18 g of xylene-methyl isobutyl ketone (1:1) as solvent.

Part B, consisted of 16 g of an aliphatic isocyanate pre-polymer.

A comparative experiment (a) was carried out with the same additives and amounts as in Example 1, but an amount of 9 g of talc was used as extender instead of the polyolefin and 34 g of common yellow oxide as pigment instead of the calcined metal oxide.

The reflectivity in the thermal infra-red region and the gloss were as follows:

|  | 3–5 μm | 8–12 μm | gloss (60°) |
| --- | --- | --- | --- |
| Example 1 | 0.50 | 0.33 | 7.8 |
| Example a | 0.08 | 0.07 | 32 |

The beneficial effects of the polyolefin extender and the pigment used, according to the present invention, clearly appear from the above results by the increased reflectivity and reduced gloss compared with known reagents for these purposes.

EXAMPLE 2

In part A, an amount of 4.5 of polyolefin extender and 30 g of polyester, were mixed with 31 g of green calcined oxide pigment and 17 g of non-leafing aluminum paste as pigments. To the mixture, the same usual additives at the same amounts as mentioned in Example 1, were also incorporated.

A comparative experiment (b) was carried out with the same additives and amounts as in Example 1, but only 35 g of polyester (67% solids) and 4.7 g of a polyolefinic extender were used, and as pigment only 35 g of yellow oxide without the calcined oxide were used.

The reflectivity in the thermal infra-red region and the gloss were as follows:

|  | 3–5 μm | 8–12 μm | gloss (60°) |
| --- | --- | --- | --- |
| Example 2 | 0.42 | 0.35 | 7.9 |
| Example b | 0.12 | 0.09 | 39. |

The beneficial effect of the pigments used according to the present invention, clearly appears from the above results by the increased reflectivity and the reduced gloss as compared with a known reagent used for this purpose.

EXAMPLE 3

In part A, an amount of 4.7 g of polyolefin and 35 g of polyester (67% solids) were mixed with 35 g of yellow calcined oxide as pigment. To the mixture, the usual additives and the same amounts as in Example 1, were incorporated.

A comparative experiment (c) was carried out with the same additives and amounts, but 51 g of polyester (67% solids) and 10.2 g of talc were used with 12.7 g of blue organic pigment.

The reflectivity in the thermal infra-red region and the gloss property were as follows:

|  | 3–5 μm | 8–12 μm | gloss (60°) |
| --- | --- | --- | --- |
| Example 3 | 0.16 | 0.09 | 30 |
| Example c | 0.08 | 0.08 | 52 |

The beneficial effects of the polyolefin extender and the calcined oxide pigment used, according to the present invention, clearly appear from the above results.

EXAMPLE 4

In part A, an amount of 4.5 g of polyolefin extender and 30 g of polyester (67% solids) were mixed with 31 g of yellow calcined oxide and 17 g of non-leafing aluminum paste as pigments. To the mixture, the same additives at the same amounts as in Example 1, were incorporated.

A comparative experiment (d) was carried out with the same additives and amounts, but only 54 g of polyester was used as extender and the pigment added was 13.4 g of blue organic pigment instead of the yellow calcined oxide and the non-leafing aluminum paste.

The results were as follows:

|  | 3–5 μm | 8–12 μm | gloss (60°) |
|---|---|---|---|
| Example 4 | 0.50 | 0.33 | 7.8 |
| Example d | 0.14 | 0.08 | 54 |

The beneficial effect of the calcined oxide and aluminum paste as pigments according to the present invention, clearly appears from the above results.

We claim:

1. Paint compositions providing a Chemical Agent Resistant Coating (CARC), consisting of one layer topcoat paint system, which imparts an increase in the reflectivity at the thermal infra-red region, while controlling the colour in the visible range and are maintaining a low gloss, which comprise:

an extender selected from polyolefins and substituted polyolefins, in an amount of from 3 to 7% by weight of the composition;

a pigment selected from a metal oxide calcined at a temperature of above 600° C., in an amount of from 30 to 50% by weight of the composition, a paste of metal flakes, in an amount of from about 12 to 30% by weight of the composition, and any mixture thereof;

a binder, and a solvent system to dissolve the components in the paint compositions, wherein the binder used is a particular modified polyurethane produced by the reaction of (i) an isocyanate and (ii) a co-reactant possessing at least two hydroxy groups and being selected from the group consisting of acrylics, epoxies and polyesters, in an amount of from 20 to 55% by weight of the composition.

2. The paint compositions according to claim 1, wherein the metal in said pigment is selected from the group consisting of cobalt, aluminum, nickel, copper and zinc, and any mixture thereof.

3. The paint compositions according to claim 1 wherein said metal oxide has a particle size below 325 mesh.

4. The paint compositions according to claim 1, wherein said paste comprises the metal flakes in a volatile hydrocarbon.

5. The paint compositions according to claim 4, wherein said volatile hydrocarbon is a mineral spirit.

6. The paint compositions according to claim 1, wherein said solvent system to dissolve the components in the paint compositions, is a volatile aromatic hydrocarbon.

7. The paint compositions according to claim 1, wherein the isocyanate prepolymer in said binder is a slurry consisting of a mixture of xylene-butyl acetate, having a solid content of 70% by weight.

* * * * *